UNITED STATES PATENT OFFICE.

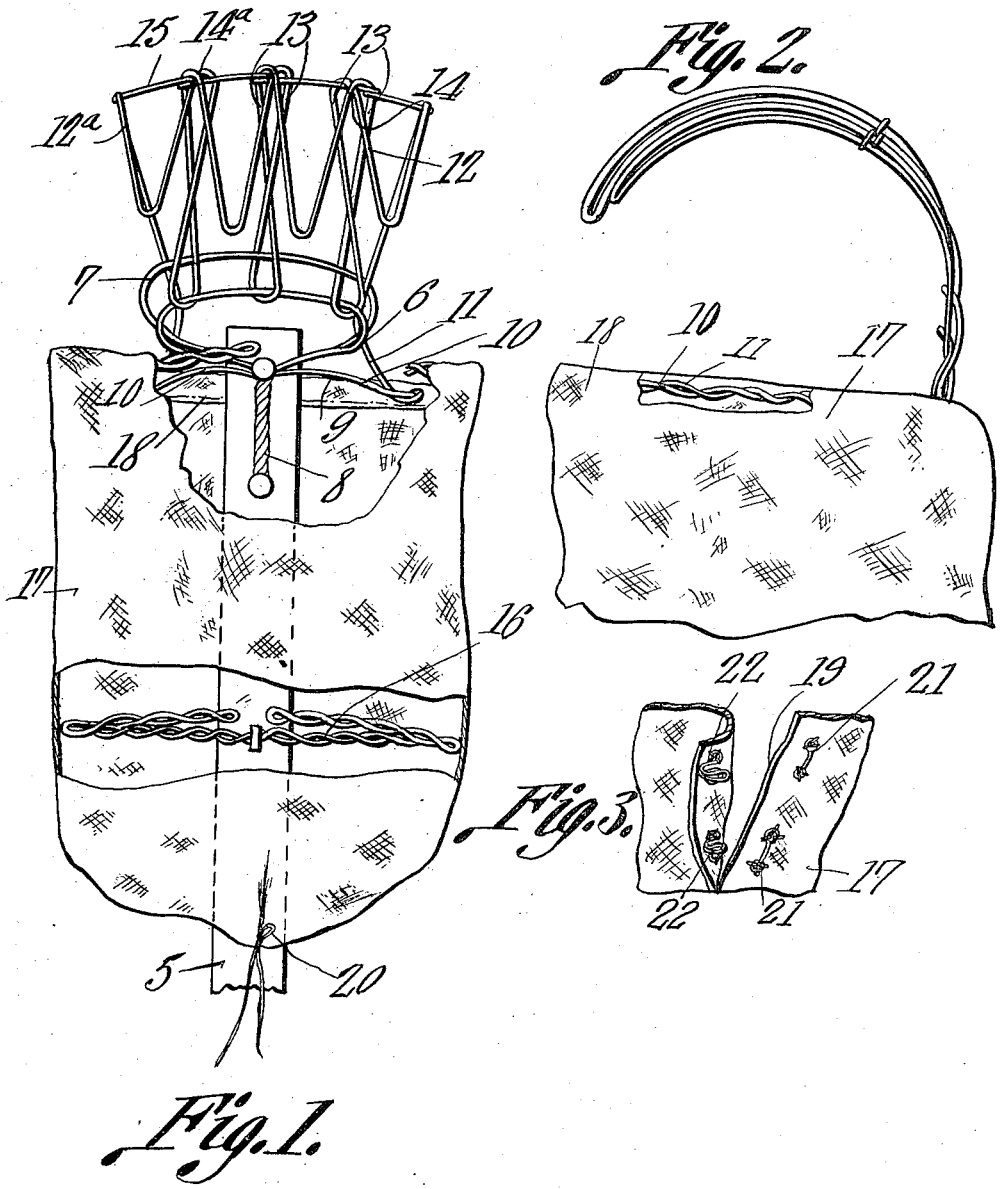

HULDAH A. BOSS, OF ST. LOUIS, MICHIGAN.

FRUIT-PICKER.

997,744.   Specification of Letters Patent.   Patented July 11, 1911.

Application filed July 25, 1910. Serial No. 573,703.

*To all whom it may concern:*

Be it known that I, HULDAH A. Boss, a citizen of the United States, residing at St. Louis, in the county of Gratiot and State of Michigan, have invented a new and useful Fruit-Picker, of which the following is a specification.

It is the object of the present invention to provide an improved construction of fruit picker and the invention relates more particularly to that class of such devices which embodies a receiving bag and means supported above the bag for engaging the fruit to be picked and it is the primary aim of the present invention to so construct the fruit picking means of the device that it will simulate in appearance and in the performance of its function, the human hand. In this connection, the invention aims to so construct this member of the device that fruit engaged thereby will not be injured if ripe or over ripe but on the other hand the device is so formed that it will yield to a slight degree and thereby prevent such injury to the fruit.

Among other details of construction, as concerns the fruit picking portion of the device, the same embodies elements resembling the fingers of the human hand, which elements are formed of resilient material and so relatively positioned as to provide kerfs in which the stems of the fruit are received prior to a downward pull exerted upon this member for the purpose of removing the fruit from the branch.

It is a further aim of the invention to so construct the fruit picking member of the device that the fruit engaged thereby will be caused to drop directly toward the middle of the bag or receptacle of the device, when picked from the branch.

A still further aim of the invention is to provide an improved receptacle for a device of this class, which receptacle is in the nature of a cloth pocket supported upon a wire frame, the pocket being removable so that it may be cleaned or a new one be substituted therefor.

With the above aims in view, the invention consists in the general construction and arrangement of parts shown in the accompanying drawings, in which, Figure 1 is a view in front elevation, parts being broken away, of the preferred form of the invention. Fig. 2 is a side elevation thereof. Fig. 3 is a detail perspective view of a portion of the pocket or receptacle of this form of the invention.

As illustrated in the drawings, the fruit picking means and the receptacle for the picked fruit are both supported at the upper end of a hand pole which is indicated by the numeral 5 and may be of any desired length and integral throughout or may be in sections to be fitted together, whereby it may be lengthened or shortened as desired. The fruit picking member of the device, in the form of the invention shown in Figs. 1 and 2 of the drawings, is made from strands of wire and among other elements it embodies a strand which is bent in such a manner as to afford a loop indicated by the numeral 6, and a strand which is also bent in such a manner as to afford a loop 7, the loop 7 being larger than the loop 6. The spaced portions of the two strands after being bent to form these loops 6 and 7, are then twisted together as at 8, together with the ends of a strand which is of considerable length. This strand, beyond each of its ends, is bent into semi-annular form as at 10. The strand is then bent back upon itself or more specifically speaking upon each of its portions 10 to form portions 11 and these portions 11 and 10 at each side of the device are twisted together as clearly shown in Fig. 2 of the drawings. The ends of these twisted portions will then be close together or in contact as is shown in the drawings so that a substantially annular ring is afforded. Beyond the portions 11, the strand above mentioned is bent back and forth upon itself a number of times to afford several elements resembling the fingers of the human hand, and these elements are indicated in the drawings by the numeral 12 and are bent substantially in the arc of a circle from their inner to their outer ends. The end ones of the elements 12 are bent on an arc of smaller radius than are the intermediate ones of the said elements so when viewed from the front, this portion of the device appears to be transversely curved as well as curved from the rear to the front.

The spaced portions of the strand constituting each element 12, are not parallel, but are so bowed or bent as at 13 that adjacent spaced portions of each two said elements will intersect each other twice. In forming the elements 12, the strand, is bent first around the loop 6 and then back and forth in front of and behind the loop 7 as clearly shown in Fig. 1 of the drawings. By so bending the adjacent portions of each two elements 12 that they will intersect in the manner described, a contracted or V-shaped kerf 14 is afforded between each pair of the finger elements 12 so that when the finger elements are engaged with their tips first over the fruit to be picked, the stem suspending the fruit will ride into one or the other of the V-shaped kerfs and as the wire from which the elements are formed is resilient, a downward pull upon the hand pole 5 carrying the elements will result in the fruit being picked from the branch in a manner almost identical with the manner in which it would be picked by hand. The spaced portions of the finger elements 12 may be held properly spaced at the rear of their kerfs 14 by means of a cross wire 15 although this wire is not absolutely essential. From an inspection of Fig. 1 of the drawings, it will be observed that the outer spaced portion of each finger element 12 is located in a position lower than the inner spaced portion so that should the stem of an apple, for example, to be picked, engage in the kerf 14$^a$ in Fig. 1 of the drawings, the portion 12$^a$ of the outer one of the two finger elements affording this kerf would first come in contact with an adjacent portion of the surface of the apple and the apple would be swung bodily toward the right of Fig. 1 and would be positioned over or nearly over the center of the bag or receptacle provided in connection with the picker so that when a downward pull is exerted upon the hand pole 5 the stem would be severed from the branch and the apple would drop directly into the receptacle or bag. This would not however necessarily happen should the spaced portions of the several elements 12 have the same curvature and be located in substantially the same position as regards elevation. The twisted portions 8 and twisted ends of the strands are secured to the hand pole 5 at the upper end thereof in the position shown in Fig. 1 of the drawings.

A strand of wire indicated by the numeral 16 is secured at a point midway between its ends to the hand pole 5 below the point of attachment of the twisted portions 8 of the picker device to the said hand pole and the portions of the strands 16 to each side of its point of attachment to the pole are bent to substantially semi-annular form so that a ring corresponding in all essential points to the ring formed by the twisted strands 10 and 11, is afforded. It will be observed at this point that the twisted portions 10 and 11 of the strand of wire heretofore specifically described, are bent up at an angle at the front as clearly shown in Fig. 2 of the drawings so that the bag supported by the rings comprising the said twisted portions 10 and 11, will be slightly elevated at the front and failure of the picked fruit to fall into the bag will be unlikely to occur. The receptacle or bag above referred to is indicated in the drawings by the reference numeral 17 and may be made of any suitable material such as heavy cloth and this bag is formed at its upper edge with a hem indicated by the numeral 18 and the bag is slit from its upper to its lower end at the rear as at 19 and is provided at its lower end with a draw string indicated by the numeral 20 which may be pulled and tied to close its said lower end. In applying the bag to the frame comprising the twisted portion 10 and 11 and the ring 16, the hem 18 is slipped over both of the twisted portions 10 and 11 so that the bag will inclose the ring 16. The bag at its open rear side is provided with eyes 21 and hooks 22 and by engaging the hooks with the eyes, the bag may be closed at the rear and thus held in place upon its supporting frame. It will now be readily understood that by grasping the hand pole 5, the picking finger elements 12 may be brought into proper engagement with an apple or other fruit to be picked and a slight downward pull exerted thereupon the fruit will be caused to leave the branch and drop into the pocket. When the pocket becomes full, the pole may be lowered and the fruit removed and when the pocket becomes soiled or so worn as to be useless, it may be readily removed by disengaging the hooks 22 from the eyes 21 and slipping it from engagement with the twisted portions 10 and 11.

What is claimed is:—

In a device of the class described, a handle member, an open annulus carried thereby, a receptacle supported by the annulus, upstanding loops carried by the handle member, and a fixed member consisting of a single strand of wire secured at its ends to the handle member and bent back and forth between its ends to afford fingers extending above the receptacle and arranged in a series, the portions of the strand constituting the fingers intersecting whereby to afford kerfs between the fingers, and a brace wire twisted about the said portions of the strand at their points of intersection.

In testimony that I claim the foregoing as my own, I have hereto affixed my signature in the presence of two witnesses.

HULDAH A. BOSS.

Witnesses:
F. H. BERNARD,
JENNIE L. SKINNER.